(12) United States Patent
Han et al.

(10) Patent No.: US 10,664,317 B2
(45) Date of Patent: May 26, 2020

(54) DISTRIBUTION OF TASKS FOR EXECUTION USING CORRELATED DATA IN MICROSERVICES ENVIRONMENTS

(71) Applicant: Accenture Global Solutions Limited, Dublin (IE)

(72) Inventors: Jingguang Han, Dublin (IE); Esteban Collado Cespon, Dublin (IE); Dadong Wan, Palatine, IL (US)

(73) Assignee: Accenture Global Solutions Limited, Dublin (IE)

( * ) Notice: Subject to any disclaimer, the term of this patent is extended or adjusted under 35 U.S.C. 154(b) by 94 days.

(21) Appl. No.: 15/786,060

(22) Filed: Oct. 17, 2017

(65) Prior Publication Data

US 2019/0114210 A1 Apr. 18, 2019

(51) Int. Cl.
*G06F 9/50* (2006.01)
*H04L 29/08* (2006.01)
(Continued)

(52) U.S. Cl.
CPC .......... *G06F 9/5033* (2013.01); *G06F 9/4806* (2013.01); *G06F 9/5077* (2013.01);
(Continued)

(58) Field of Classification Search
CPC ... G06F 3/067; G06F 7/38; G06F 9/30; G06F 9/455; G06F 9/45558; G06F 16/254; G06F 16/22; G06F 16/2365; G06F 19/00; G06F 11/1451; G06F 16/1865; G06F 16/1873; G06F 16/211; G06F 16/219; G06F 16/2386; G06F 16/2453; G06F 16/24556; G06F 11/00; G06F 11/004; G06F 11/0709; G06F 11/0751; G06F 11/0775; G06F 11/0793; G06F 11/1471; H04L 67/12; H04L 67/02; H04L 5/0023; H04L 67/10; H04L 12/00; H04L 5/0044; H04L 65/4076; H04L 12/18; H04L 1/0041; H04L 67/42; H04L 67/16; H04L 67/34; H04L 67/104;
(Continued)

(56) References Cited

U.S. PATENT DOCUMENTS

2014/0136381 A1* 5/2014 Joseph ................... G06Q 40/02 705/35
2016/0248861 A1* 8/2016 Lawson ................ H04L 65/403
(Continued)

OTHER PUBLICATIONS

Extended European Search Report for Application No. EP18199024.3, dated Apr. 3, 2019, 10 pages.

*Primary Examiner* — Djenane M Bayard
(74) *Attorney, Agent, or Firm* — Harrity & Harrity, LLP

(57) ABSTRACT

A system includes one or more devices to receive a first set of data. The system transmits the first set of data to a first data store for storage. The first data store is of a first data format type. The system transmits the first set of data to a node of a plurality of nodes. The node to perform an action on the first set of data and a second set of data to generate a third set of data. The node to transmit the third set of data to a third data store. The third data store being of a third data format type that is different than the first data format type and the second data format type. The system transmits the third set of data from the third data store to the first data store for reporting.

20 Claims, 5 Drawing Sheets

(51) Int. Cl.
*G06F 9/48* (2006.01)
*H04L 12/24* (2006.01)

(52) U.S. Cl.
CPC ...... H04L 67/1004 (2013.01); H04L 67/1097 (2013.01); *H04L 41/50* (2013.01); *H04L 67/10* (2013.01)

(58) Field of Classification Search
CPC . H04L 67/1097; H04L 12/1403; H04L 43/08; H04L 61/2575; H04L 61/308; H04L 63/20; H04L 67/141; H04L 67/22; H04L 41/0803; H04L 63/1408; H04L 67/2823; H04L 67/32; H04L 12/14; H04L 41/08; H04L 61/2514; H04L 61/2564; H04L 61/2589; H04L 65/403; H04L 65/601; H04L 65/80; H04L 67/1031; H04L 67/327; H04L 2209/38; H04L 41/0806; H04L 41/0816; H04L 41/0893
See application file for complete search history.

(56) References Cited

U.S. PATENT DOCUMENTS

| | | | |
|---|---|---|---|
| 2017/0061345 A1* | 3/2017 | Jones, III | G06Q 50/01 |
| 2017/0195439 A1* | 7/2017 | Dixon | H04L 61/2007 |
| 2018/0084063 A1* | 3/2018 | Miedema | H04L 67/16 |
| 2018/0191867 A1 | 7/2018 | Siebel et al. | |
| 2018/0246944 A1 | 8/2018 | Yelisetti et al. | |
| 2018/0295059 A1* | 10/2018 | Gamage | H04L 45/745 |
| 2018/0376534 A1* | 12/2018 | Mustafic | H04W 92/02 |
| 2019/0075155 A1* | 3/2019 | Wei | G06F 9/5077 |

\* cited by examiner

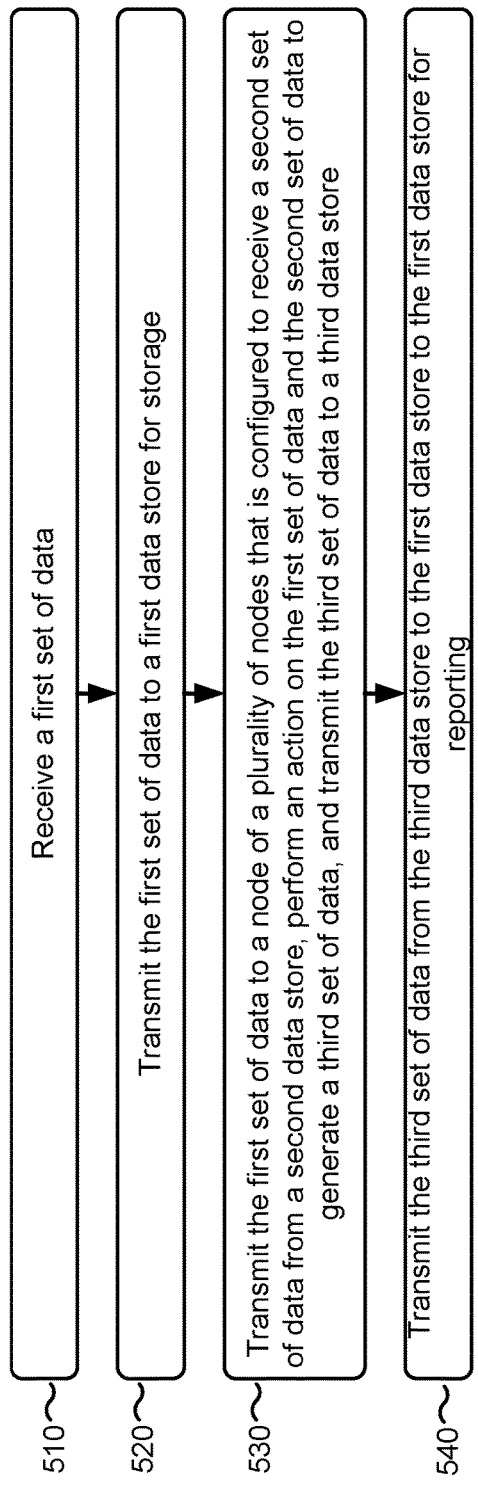

US 10,664,317 B2

DISTRIBUTION OF TASKS FOR EXECUTION USING CORRELATED DATA IN MICROSERVICES ENVIRONMENTS

BACKGROUND

A microservices architecture can refer to a software application that includes a suite of independently deployable and modular applications that each execute a unique process and interact to achieve an overall functionality of the software application.

SUMMARY

According to some possible implementations, a device (or a set of devices) may include one or more processors (CPUs, GPUs, and/or the like) to receive a first set of data; transmit the first set of data to a first data store for storage, the first data store being of a first data format type; transmit the first set of data to a node of a plurality of nodes, each node, of the plurality of nodes, being configured to receive a second set of data from a second data store, the second data store being of a second data format type that is different than the first data format type, the node to perform an action on the first set of data and the second set of data to generate a third set of data, the node to transmit the third set of data to a third data store, the third data store being of a third data format type that is different than the first data format type and the second data format type; and transmit the third set of data from the third data store to the first data store for reporting.

According to some possible implementations, a method may include receiving, by a device, a first set of data; transmitting, by the device, the first set of data to a first data store for storage, the first data store being of a first data format type; transmitting, by the device, the first set of data to a node of a plurality of nodes, each node, of the plurality of nodes, being configured to receive a second set of data from a second data store, the second data store being of a second data format type that is different than the first data format type, the node to perform an action on the first set of data and the second set of data to generate a third set of data, the node to transmit the third set of data to a third data store, the third data store being of a third data format type that is different than the first data format type and the second data format type; and transmitting, by the device, the third set of data from the third data store to the first data store for reporting.

According to some possible implementations, a non-transitory computer-readable medium may one or more instructions that, when executed by one or more processors of a device, cause the one or more processors to receive a first set of data; transmit the first set of data to a first data store for storage, the first data store being of a first data format type; transmit the first set of data to a node of a plurality of nodes, each node, of the plurality of nodes, being configured to receive a second set of data from a second data store, the second data store being of a second data format type that is different than the first data format type, the node to perform an action on the first set of data and the second set of data to generate a third set of data, the node to transmit the third set of data to a third data store, and the third data store being of a third data format type that is different than the first data format type and the second data format type; and transmit the third set of data from the third data store to the first data store for reporting.

BRIEF DESCRIPTION OF THE DRAWINGS

FIG. 5 is a flow chart of an example process for distributing data sets for reporting.

DETAILED DESCRIPTION

Figure 1:
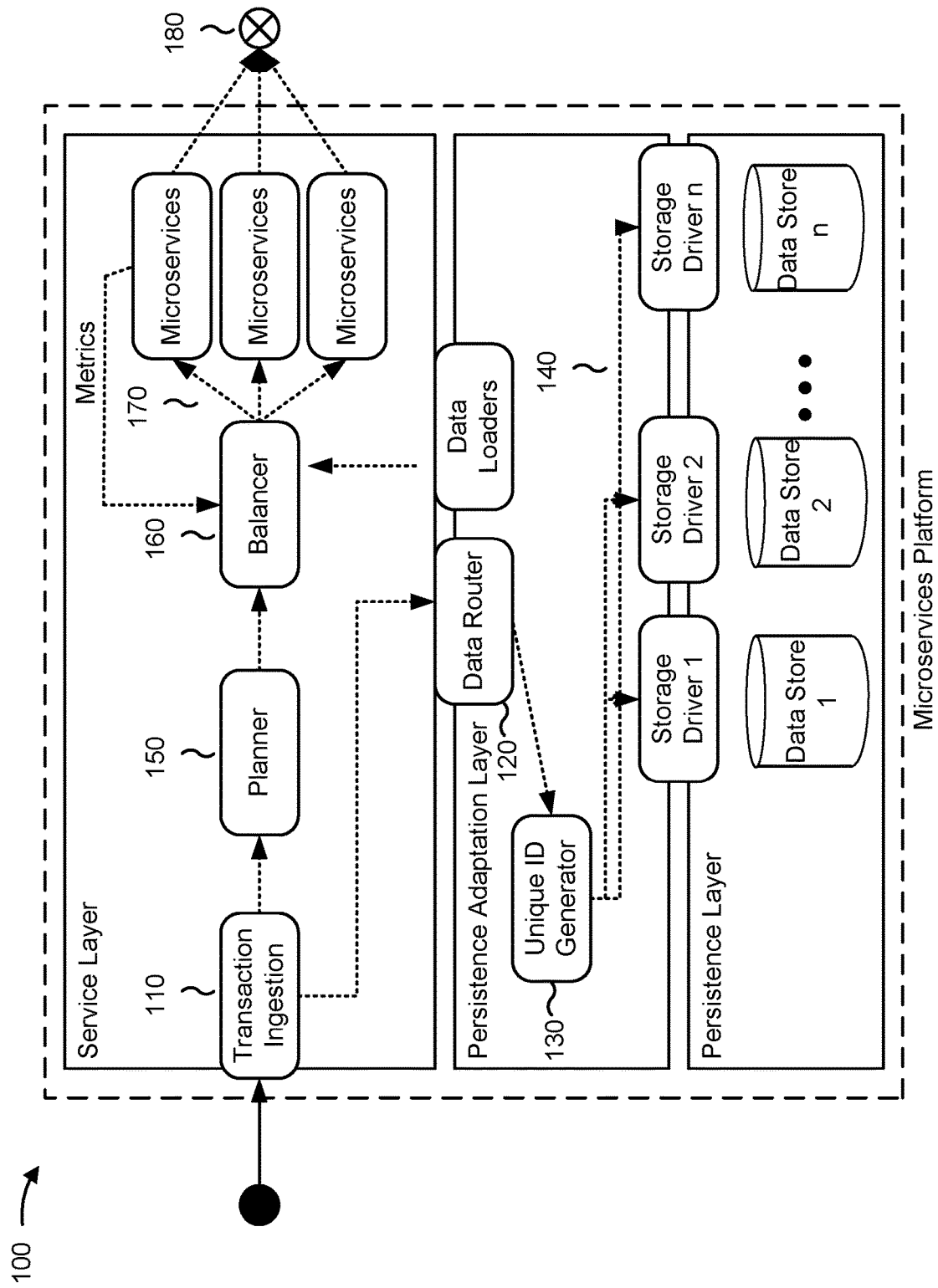
FIG. 1 is a diagram of an overview of an example implementation described herein.

The following detailed description of example implementations refers to the accompanying drawings. The same reference numbers in different drawings may identify the same or similar elements.

A microservices application can refer to an application that includes a set of microservices. A microservice includes an application that performs a functionality of the microservices application. In other words, microservices, of the microservices application, can refer to independent applications that interact over a network to perform an overall functionality of the microservices application. In some cases, a microservices application can include hundreds, thousands, etc. of microservices.

The microservices application can receive an input associated with a set of tasks to be executed. A first microservice can execute a first task that is associated with a first functionality of the microservices application, a second microservice can execute a second task that is associated with a second functionality of the microservices application, etc. A microservice can generate an execution result based on executing a task, and communicate the execution result to other microservices via application programming interfaces (APIs) (e.g., RESTful APIs, data access object (DAO) APIs, and/or the like), via messaging queues, and/or the like. In this way, microservices may communicate execution results to achieve an overall functionality of the microservices application.

As a particular example, the microservices application might include an anti money-laundering (AML) application. For example, the microservices application may detect, prevent, report, and/or the like, money laundering by analyzing input data associated with a set of data sources. The data sources can include a news data source, a social media data source, a cloud data source, an internal data source, and/or the like. The input data may include financial transactions data, entity data in the form of nodes of a graph format, news leaks data, and/or the like. An execution result may include a determination whether the entity is engaging and/or has engaged in money-laundering operations, and/or the like.

While some implementations herein describe an AML application, it should be understood that implementations described herein are applicable to other types of microservices applications that analyze other types of input data to generate other types of execution results.

A microservices application can utilize data associated with multiple types of data stores (e.g., graph databases, relational databases, structured query language (SQL) databases, NoSQL databases, and/or the like). In some cases, different data stores can store respective data items that each refer to a same underlying event. Continuing with the above example regarding the AML application, a set of data stores can store respective data items that are each based on a same underlying financial transaction. For example, a graph database can store a data item that includes information regarding a relationship between entities associated with the financial transaction. Additionally, a relational database can store a data item that includes information regarding the financial transaction, such as the entities involved in the financial transaction, a monetary value associated with the financial transaction, a date of the financial transaction, and/or the like.

Different microservices of a microservices application can process data that is associated with different data formats and/or stored by different types of data stores. Continuing with the above example regarding the AML, application, a first microservice of the AML application can execute tasks using input data associated with a graph database, a second microservice of the AML application can execute tasks using input data associated with a relational database, etc. As such, the ability to maintain data consistency might be valuable in order to maintain accuracy of the microservices application (e.g., the capability of the microservices application to generate a correct result, an expected result, and/or the like). In other words, different microservices might process different data items that each refer to the same underlying event (or, in some cases, an input to one microservice might be an output of another microservice). Accuracy might be reduced in the situation where the different microservices are incapable of identifying that the data items and/or execution results generated using the data items are associated with a same underlying event.

Additionally, different computing resources (e.g., cloud computing servers, personal computers, workstation computers, server devices, and/or other types of computation and/or communication devices) can execute different microservices of the microservices application. As such, the ability to load balance tasks across different computing resources may be desirable.

Some implementations described herein provide a microservices platform that may receive information associated with an event that is to be processed by a set of microservices. Additionally, some implementations described herein permit the microservices platform to correlate a unique identifier and set of data items that is associated with a same underlying event, and permit the microservices platform to store the set of data items in a set of data stores. In this way, the microservices platform may identify, using the unique identifier, that the set of data items is associated with a same underlying event, thereby improving accuracy of the microservices application.

Some implementations described herein permit the microservices platform to identify a set of tasks that is to be executed by the set of microservices. Additionally, some implementations described herein permit the microservices platform to determine a set of metrics associated with a set of computing resources that is executing the set of microservices (e.g., resource utilization values, network metric values, and/or the like).

In this way, the microservices platform may distribute the tasks for execution based on respective metrics of the computing resources. Thereby, some implementations described herein permit the microservices platform to load balance and/or efficiently distribute tasks for execution. In this way, some implementations described herein more efficiently utilize processor and/or memory resources of computing resources, increase throughput, increase bandwidth, reduce latency, and/or the like, than as compared to situations where tasks are distributed irrespective of metrics of computing resources.

FIG. 1 is a diagram of an overview of an example implementation 100 described herein. As shown in FIG. 1, example implementation 100 may include a microservices platform that includes a service layer, a persistence adaptation layer, and a persistence layer. Different layers of the microservices platform may include different functional modules that are implemented in hardware, firmware, software, and/or a combination thereof.

As further shown in FIG. 1, the service layer may include a transaction ingestion module, a planner module, a balancer module, and a set of microservices. As further shown in FIG. 1, the persistence adaptation layer may include a data router, data loaders, a unique identifier generator module, and a set of storage drivers. As further shown in FIG. 1, the persistence layer may include a set of data stores.

As further shown in FIG. 1, and by reference number 110, the microservices platform (e.g., the transaction ingestion module of the service layer) may receive information associated with an event that is to be processed by a set of microservices. As further shown in FIG. 1, and by reference number 120, the microservices platform (e.g., the data router of the persistence adaptation layer) may generate, using the information associated with the event, a set of data items that is associated with a set of data formats. For example, the set of data formats may correspond to the set of data stores. In other words, the different data stores may store data that is associated with different formats.

As further shown in FIG. 1, and by reference number 130, the microservices platform (e.g., the unique identifier generator module of the persistence adaption layer) may correlate the set of data items and a unique identifier. As further shown in FIG. 1, and by reference number 140, the microservices platform (e.g., the unique identifier generator module of the persistence adaptation later) may provide the set of data items to a set of data stores after correlating the set of data items and the unique identifier.

As further shown in FIG. 1, and by reference number 150, the microservices platform (e.g., the planner module of the service layer) may determine a set of tasks to be executed by the set of microservices in order to process the information associated with the event. As further shown in FIG. 1, and by reference number 160, the microservices platform (e.g., the balancer module of the service layer) may determine a set of metrics associated with a set of computing resources associated with the set of microservices. For example, the set of metrics may include resource utilization values (e.g., processor utilization values, memory utilization values, and/or the like), network metric values (e.g., throughput values, latency values, bandwidth values, and/or the like), and/or the like, of a set of computing resources that is executing the set of microservices.

As further shown in FIG. 1, and by reference number 170, the microservices platform (e.g., the balancer module of the service layer) may provide, to a subset of the set of computing resources and based on the set of metrics, the set of data items to permit the set of microservices to execute the set of tasks. For example, the microservices platform (e.g., the data loader module) may identify the data items using the unique identifier, and provide the data items to the balancer module to permit the data items to be processed by the set of microservices.

As further shown in FIG. 1, and by reference number 180, the microservices platform may receive information associated with an execution result after providing the set of data items to the subset of the set of computing resources.

In this way, the microservices platform may identify, using the unique identifier, that the set of data items is associated with a same underlying event, thereby maintaining accuracy of the microservices application. Also in this way, the microservices platform may distribute the tasks for execution based on respective metrics of the computing resources. Thereby, the microservices platform may load balance and/or efficiently distribute tasks for execution. In this way, the microservices platform more efficiently utilizes processor and/or memory resources of computing resources, increases throughput, increases bandwidth, reduces latency, and/or the like, as compared to situations where the microservices platform distributes tasks without having identified and/or used the set of metrics.

As indicated above, FIG. 1 is provided merely as an example. Other examples are possible and may differ from what was described with regard to FIG. 1.

Figure 2:
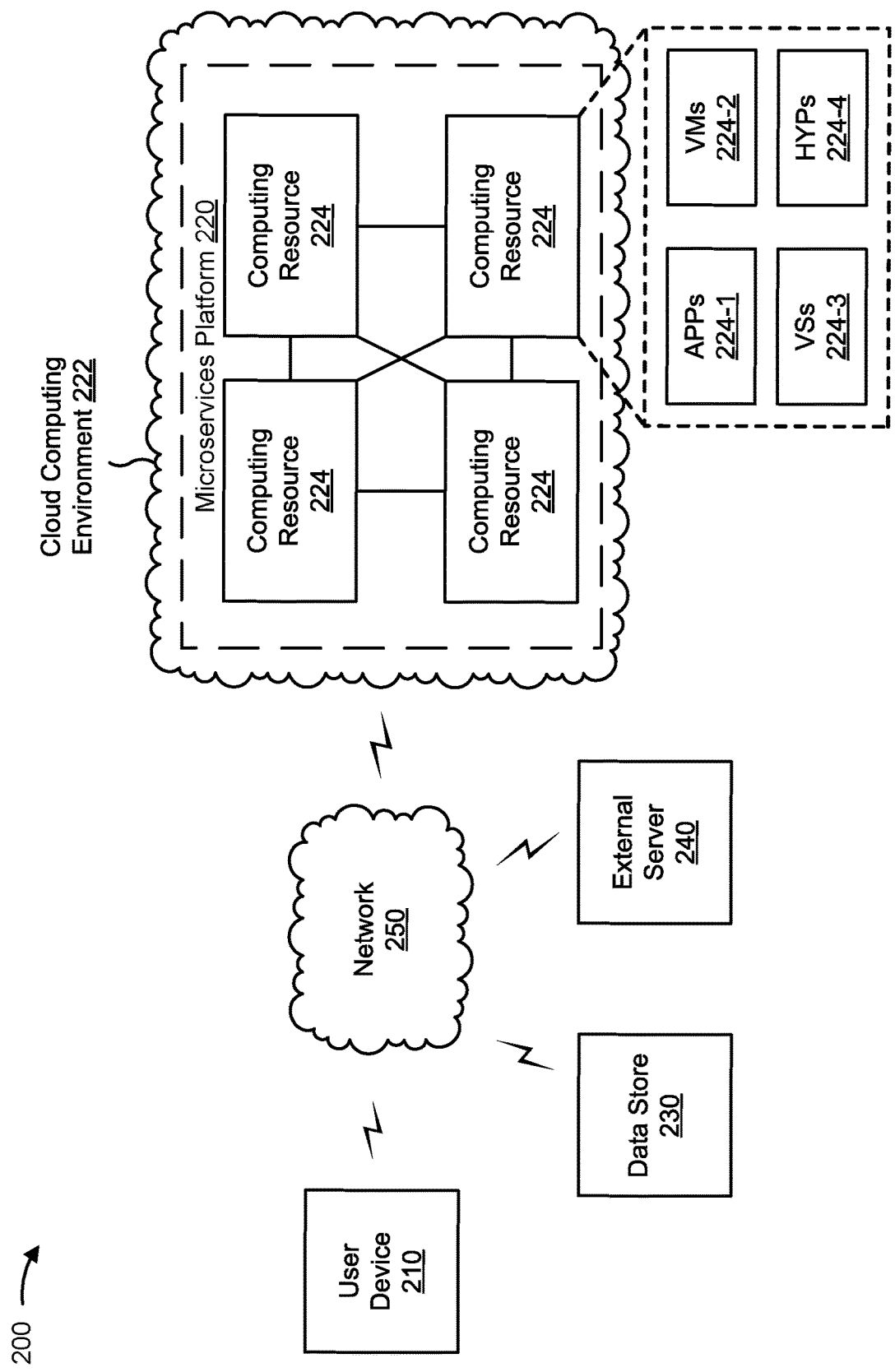
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a microservices platform 220, a data store 230, an external server 240, and a network 250. Devices of environment 200 may interconnect via wired connections, wireless connections, or a combination of wired and wireless connections.

User device 210 includes one or more devices capable of receiving, generating, storing, processing, and/or providing information associated with microservices platform 220. For example, user device 210 may include a device, such as a desktop computer, a laptop computer, a tablet computer, a handheld computer, a server device, a mobile phone (e.g., a smart phone or a radiotelephone), a wearable communication device (e.g., a smart wristwatch, an activity band, or a pair of smart eyeglasses), a gaming device, or a similar type of device.

Microservices platform 220 includes one or more devices capable of distributing tasks associated with a microservices application. In some implementations, microservices platform 220 may be designed to be modular such that certain software components can be swapped in or out depending on a particular need. As such, microservices platform 220 may be easily and/or quickly reconfigured for different uses.

Some implementations herein describe models. In some implementations, microservices platform 220 may use machine learning techniques to analyze data (e.g., training data, such as historical data, etc.) and create models. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, and/or the like.

In some implementations, microservices platform 220 may use another kind of computer-implemented technique, such as artificial intelligence, machine perception, or computer vision, to analyze data and generate models.

In some implementations, as shown, microservices platform 220 may be hosted in a cloud computing environment 222. Notably, while implementations described herein describe microservices platform 220 as being hosted in cloud computing environment 222, in some implementations, microservices platform 220 may not be cloud-based (i.e., may be implemented outside of a cloud computing environment) or may be partially cloud-based.

Cloud computing environment 222 includes an environment that hosts microservices platform 220. Cloud computing environment 222 may provide computation, software, data access, storage, etc. services that do not require end-user (e.g., user device 210) knowledge of a physical location and configuration of system(s) and/or device(s) that hosts microservices platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host microservices platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with microservices platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Data store 230 includes one or more devices capable of receiving, storing, and/or providing information for use by microservices platform 220. For example, data store 230 may include a server or a group of servers. In some implementations, data store 230 may provide, to microservices platform 220, information and/or resources.

External server 240 includes one or more devices, accessible through network 250, that are sources of information that may be used by microservices platform 220. For example, external server 240 may include a server that includes particular information for use by microservices platform 220 and/or user device 210. For example, external server 240 may include a server or a group of servers (e.g., a cloud-based server, an application device, a content server, a host server, a web server, a database server, etc.), a desktop computer, or a similar device.

Network 250 may include one or more wired and/or wireless networks. For example, network 250 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
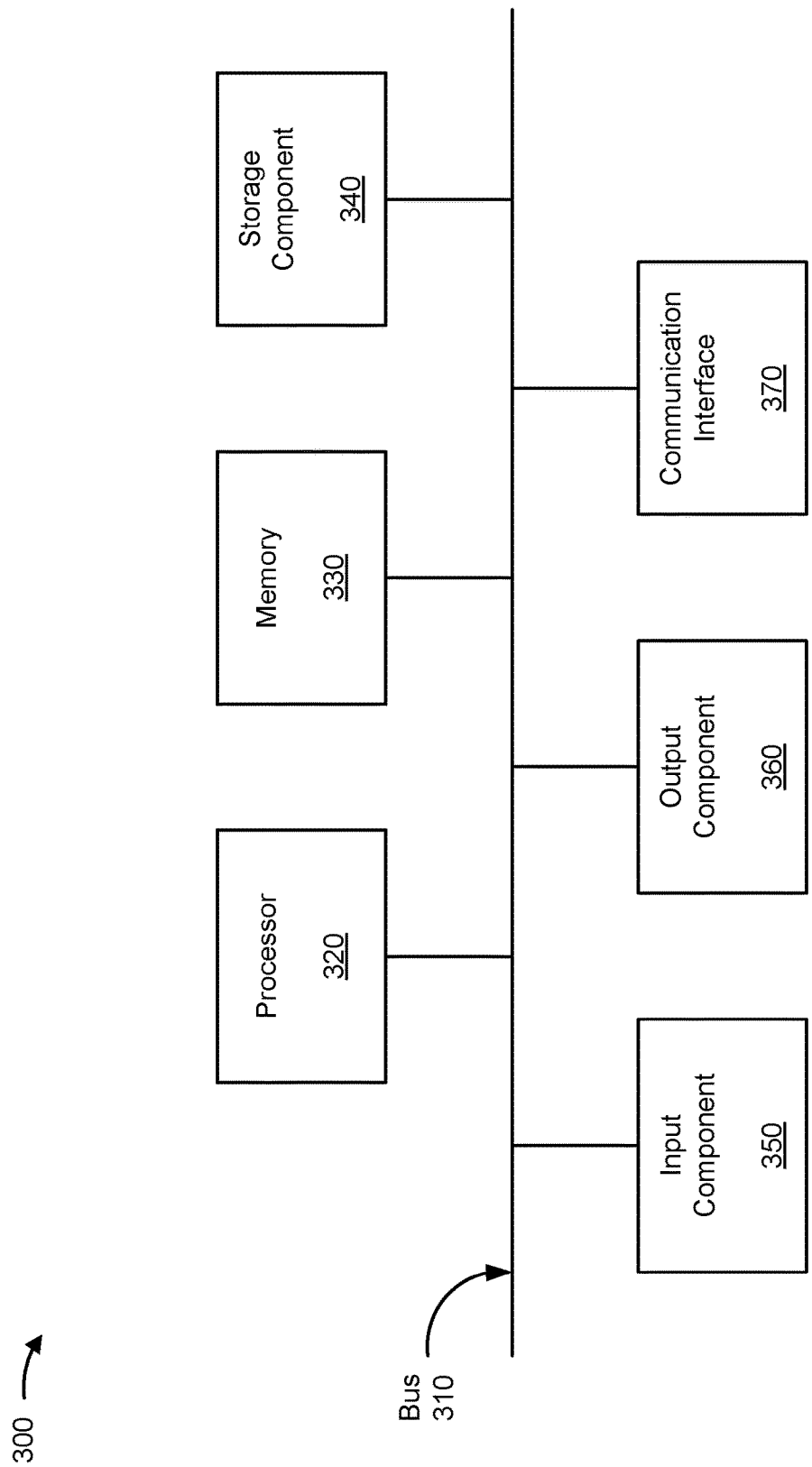
FIG. 3 is a diagram of example components of one or more devices of FIG. 2.

FIG. 3 is a diagram of example components of a device 300. Device 300 may correspond to user device 210, microservices platform 220, computing resource 224, data store 230, and/or external server 240. In some implementations, user device 210, microservices platform 220, computing resource 224, data store 230, and/or external server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
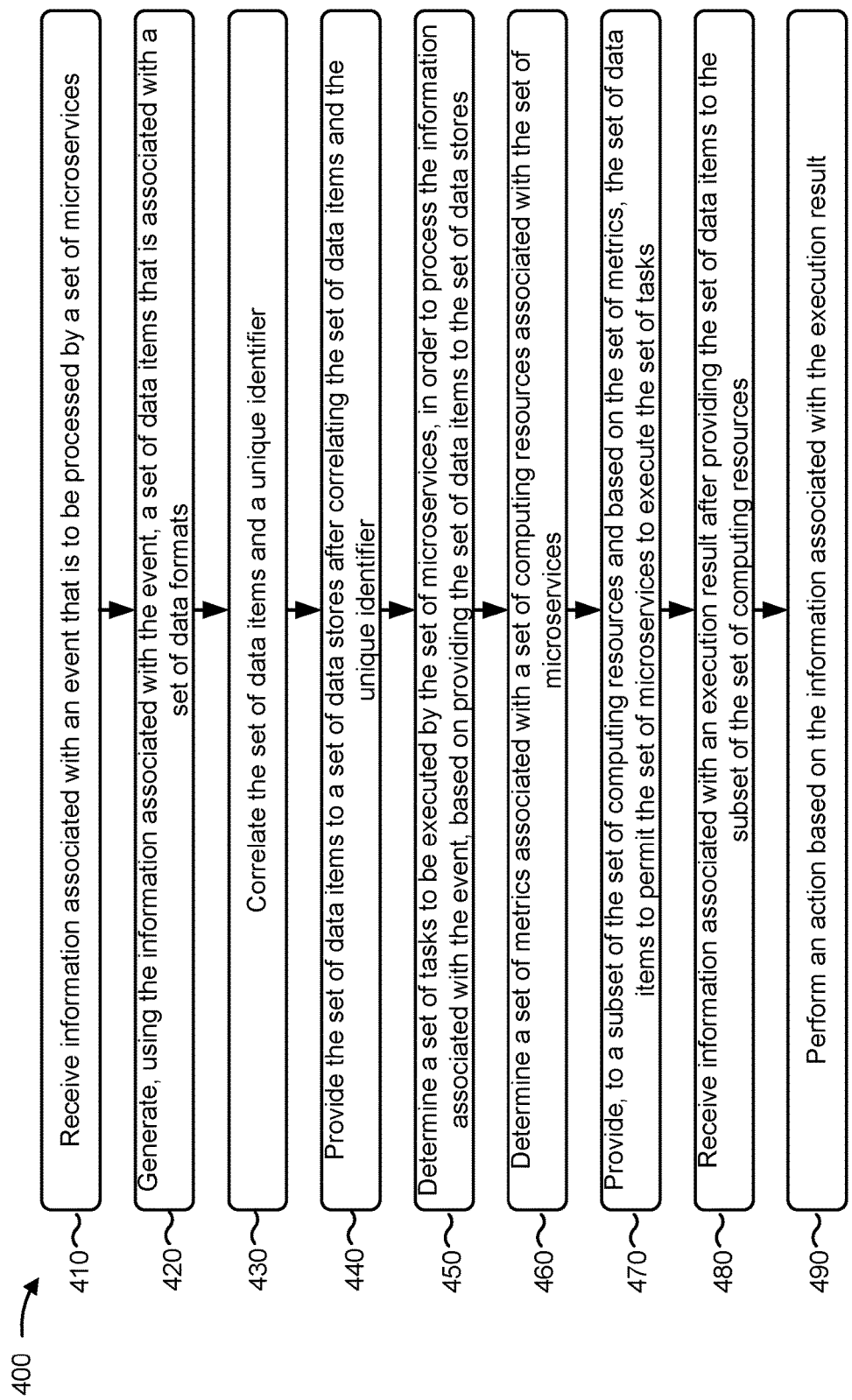
FIG. 4 is a flow chart of an example process for distributing tasks for execution using correlated data in a microservices environment.

FIG. 4 is a flow chart of an example process 400 for distributing tasks for execution using correlated data in a microservices environment. In some implementations, one or more process blocks of FIG. 4 may be performed by microservices platform 220. In some implementations, one or more process blocks of FIG. 4 may be performed by another device or a group of devices separate from or including microservices platform 220, such as user device 210, data store 230, and/or external server 240.

As shown in FIG. 4, process 400 may include receiving information associated with an event that is to be processed by a set of microservices (block 410). For example, microservices platform 220 may receive input information associated with an event that is to be processed by a microservices application associated with microservices platform 220.

In some implementations, the information associated with the event may correspond to input data that is to be processed by a microservices application. For example, the information associated with the event may refer to any type of data that is capable of being processed by a microservices application to generate an execution result. As a particular example, and referring to an AML application, the information associated with the event may include information associated with a financial transaction, a news article, a leak, and/or the like.

In some implementations, the information associated with the event may include a set of parameters. As a particular example, assume that the information associated with the event corresponds to a financial transaction. In this case, the set of parameters may include a first entity associated with the financial transaction, a second entity associated with the financial transaction, a monetary value associated with the financial transaction, a date of the financial transaction, a time of the financial transaction, a location of the financial transaction, and/or the like.

In some implementations, microservices platform 220 may receive, from external server 240, the information associated with the event. For example, microservices platform 220 may receive the information associated with the event using set of application programming interfaces (APIs), representational state transfer (REST) interfaces, hypertext transfer protocol (HTTP) interfaces, and/or the like.

In some implementations, microservices platform 220 may receive the information associated with the event based on an occurrence of the event, based on a time frame, based on receiving an instruction from user device 210, based on providing a request to external server 240, and/or the like.

In this way, microservices platform 220 may receive the information associated with the event, and may generate a set of data items using the information associated with the event, as described below.

As further shown in FIG. 4, process 400 may include generating, using the information associated with the event, a set of data items that is associated with a set of data formats (block 420), correlating the set of data items and a unique identifier (block 430), and providing the set of data items to a set of data stores after correlating the set of data items and the unique identifier (block 440). For example, microservices platform 220 may generate a set of data items using the information associated with the event, correlate the set of data items and a unique identifier, and provide the set of data items to a set of data stores 230.

In some implementations, microservices platform 220 (e.g., a service layer that includes a set of functional modules implemented in hardware, firmware, software, and/or a combination thereof) may receive the information associated with the event and generate configuration information that is to be used when generating the set of data items.

In some implementations, microservices platform 220 (e.g., the service layer) may generate configuration information that identifies a data type of the information associated with the event. In some implementations, a data type may include an identifier of the information associated with the event. As examples, a data type may include "financial transaction," "news article," "leak," "legal proceeding," "stock price," and/or the like.

In some implementations, microservices platform 220 (e.g., the service layer) may generate configuration information that identifies a persistence type of the information associated with the event. In some implementations, a persistence type may identify a set of data stores 230 that is to store the set of data items. As examples, a persistence type may include "all," "graph," "relational," NoSQL," and/or the like. In other words, the persistence type may identify data stores 230 and/or types of data stores 230 that are to store data items associated with the information associated with the event.

In some implementations, microservices platform 220 (e.g., the service layer) may generate configuration information that identifies a redundancy type. In some implementations, a redundancy type may identify whether multiple copies of the set of data items are to be stored by data stores 230. As examples, a redundancy type may include "at least one," "multiple," and/or the like. In other words, a redundancy type may identify a number of data stores 230 to which a particular data item is to be provided for storage.

In this way, microservices platform 220 (e.g., the service layer) may generate the configuration information to permit other layers of microservices platform 220 to process the information associated with the event, as described below.

In some implementations, microservices platform 220 (e.g., a persistence adaptation layer that includes a set of functional modules implemented in hardware, firmware, software, and/or a combination thereof) may receive the information associated with the event and the configuration information.

In some implementations, microservices platform 220 (e.g., the persistence adaptation layer) may generate a unique identifier that is to be correlated with the set of data items. For example, the unique identifier may be used to correlate the set of data items. In other words, each data item, of the set of data items, may be associated with the unique identifier. In this way, different microservices, of the microservices application, may execute tasks using different data items that are each associated with the unique identifier. In this way, microservices platform 220 may increase accuracy of an execution result by permitting the different microservices to identify that different data points refer to the same underlying event.

In some implementations, microservices platform 220 (e.g., the persistence adaptation layer) may generate the unique identifier using a set of parameters of the information associated with the event. For example, microservices platform 220 may implement a technique, such as a concatenation technique, a hashing technique, and/or the like, using values associated with the set of parameters.

As an example, assume that the information associated with the event includes a financial transaction involving a first entity and a second entity. In this case, microservices platform 220 may implement a hashing technique using an identifier of the first entity, an identifier of the second entity, a date of the financial transaction, a time of the financial transaction, and/or the like. Additionally, or alternatively, microservices platform 220 may generate the unique identifier randomly, may generate the unique identifier by adding a prefix to another identifier, and/or the like.

In some implementations, microservices platform 220 (e.g., the persistence adaptation layer) may identify a set of data routers to which to provide data items. In some implementations, a data router may include a functional module that may provide a data item to a particular data store 230. For example, a data router may include a particular driver that is capable of communicating with a particular data store 230 (e.g., configured to perform write and/or read operations to and/or from data store 230).

In some implementations, microservices platform 220 (e.g., the persistence adaptation layer) may identify the set of data routers based on the configuration information. For example, microservices platform 220 may identify the set of data routers based on the persistence type, and provide the information associated with the event to the set of data routers.

In some implementations, microservices platform 220 (e.g., data routers of microservices platform 220) may receive the information associated with the event, and generate data items to be provided to respective data stores 230. In some implementations, microservices platform 220 may generate a set of data items, using the information associated with the event, that corresponds to the same underlying event.

In some implementations, microservices platform 220 may generate a data item that includes a particular data format. For example, microservices platform 220 may, using the configuration information (e.g., the persistence type), identify a particular data store 230 that is to receive the data item for storage. Additionally, or alternatively, microservices platform 220 may generate the data item to permit the data item to be stored by the particular data store 230. For example, microservices platform 220 may generate data items that include particular data formats that permit the data items to be stored by different types of data stores 230, such as a navigational database, a graph database, a hierarchical database, a relational database, an entity-relationship model database, an object model database, a document model database, an entity-attribute-value model database, and/or the like.

In some implementations, microservices platform 220 (e.g., a data router) may receive the information associated with the event. Additionally, or alternatively, microservices platform 220 may modify the information associated with the event when generating data items. For example, microservices platform 220 may remove particular information associated with the event. As a particular example, assume that the information associated with the event includes a financial transaction, and that a data item associated with the financial transaction is to be stored in a graph database. In this case, the data router may remove information associated with a date, a time, and a monetary value of the financial transaction because the graph database is to store information concerning relationships between entities associated with financial transaction, rather than information concerning dates and/or the monetary values of the financial transactions.

In some implementations, microservices platform 220 may, using a set of drivers, provide the data items to respective data stores 230 to permit the data items to be stored for later use.

In some implementations, microservices platform 220 (e.g., a persistence layer that includes a set of functional modules implemented in hardware, firmware, software, and/or a combination thereof) may receive the data items, and write the set of data items to respective data stores 230.

In this way, data stores 230 may store the set of data items. Additionally, in this way, microservices platform 220 may permit microservices to execute tasks using the set of data items, as described elsewhere herein.

As further shown in FIG. 4, process 400 may include determining a set of tasks to be executed by the set of microservices, in order to process the information associated with the event, based on providing the set of data items to the set of data stores (block 450). For example, microservices platform 220 may determine a set of tasks that is to be executed by the set of microservices in order to process the information associated with the event based on providing the set of data items to the set of data stores.

In some implementations, microservices platform 220 may determine a set of tasks to be executed by the set of microservices based on the microservices application. For example, microservices platform 220 may identify the set of microservices that is associated with the microservices application, and may identify a set of tasks that is to be executed by the set of microservices. In other words, microservices platform 220 may identify the set of tasks that is to be executed to perform a functionality of the microservices application.

In some implementations, microservices platform 220 may identify a set of computing resources 224 that is executing the set of microservices. For example, microservices platform 220 may identify available computing resources 224 that are executing the set of microservices. In this way, microservices platform 220 may determine a set of metrics associated with a set of computing resources 224 associated with the set of microservices, as described below.

As further shown in FIG. 4, process 400 may include determining a set of metrics associated with a set of computing resources associated with the set of microservices (block 460). For example, microservices platform 220 may determine a set of metrics associated with a set of computing resources 224 associated with the set of microservices.

In some implementations, microservices platform 220 may receive, from computing resources 224, information associated with metrics of computing resources 224. In some implementations, a metric may be associated with a resource utilization value such as a processor utilization value, a memory utilization value, and/or the like. Additionally, or alternatively, a metric may be associated with a network metric value such as a bandwidth value, a latency value, a throughput value, a jitter value, a delay value, and/or the like. Additionally, or alternatively, a metric may be associated with a task status, such as a number of tasks awaiting execution, a number of tasks currently being executed, and/or the like.

In some implementations, microservices platform 220 may receive information associated with the set of metrics in real-time. For example, microservices platform 220 may receive the information substantially concurrently with computing resource 224 determining the set of metrics and/or providing the set of metrics. Additionally, or alternatively, microservices platform 220 may determine the set of metrics based on a model. For example, microservices platform 220 may train a set of models using historical data, and use the models to determine a set of metrics.

In this way, microservices platform 220 may use the set of metrics to identify a subset of the set of computing resources that is to execute the set of tasks, as described below.

As further shown in FIG. 4, process 400 may include providing, to a subset of the set of computing resources and based on the set of metrics, the set of data to permit the set of microservices to execute the set of tasks (block 470). For example, microservices platform 220 may provide, to a subset of the set of computing resources 224 and based on the set of metrics, the set of data items to permit the set of microservices to execute the set of tasks.

In some implementations, microservices platform 220 may select particular computing resources 224 to execute the tasks based on the set of metrics. In this way, microservices platform 220 may load balance and/or efficiently distribute tasks across different computing resources 224.

In some implementations, microservices platform 220 may identify computing resources 224 associated with metrics that includes values that satisfy a threshold. For example, microservices platform 220 may identify a computing resource 224 associated with a throughput value that satisfies (e.g., is greater than) a throughput threshold value, and select the computing resource 224 to execute a task (e.g., because the computing resource 224 may execute the task more quickly than as compared to another computing resource 224).

As another example, microservices platform 220 may identify a computing resource 224 associated with a processor utilization value that satisfies (e.g., is less than) a processor utilization value threshold, and select the computing resource 224 to execute a task (e.g., because the computing resource 224 may include more available resources than as compared to other computing resources 224).

In this way, microservices platform 220 may identify computing resources 224, that are to execute the set of tasks, based on metrics associated with the computing resources 224. In this way, some implementations described herein permit more efficient resource utilization, increased throughput, reduced latency, and/or the like, than as compared to situations where microservices platform 220 identifies computing resources 224 irrespective of the set of metrics.

In some implementations, microservices platform 220 may identify a set of data items that is to be input to the microservices application. For example, microservices platform 220 may identify the set of data items based on a unique identifier. That is, microservices platform 220 may identify data items that include the same unique identifier, and provide the data items to respective microservices of the microservices application. In this way, microservices platform 220 may receive information associated with an execution result, as described below.

As further shown in FIG. 4, process 400 may include receiving information associated with an execution result after providing the set of data items to the subset of the set of computing resources (block 480). For example, microservices platform 220 may receive information associated with an execution result associated with the set of tasks after providing the set of data items to the subset of the set of computing resources 224.

In some implementations, a microservices application may include microservices that communicate to achieve a functionality of the microservices application. For example, the microservices may generate an execution result based on executing respective tasks of the set of tasks. As an example, an AML application may generate an execution result that includes a determination regarding whether an entity is engaging in money-laundering operations.

In some implementations, microservices application 220 may receive the information associated with the execution result based on providing the set of data items to the set of microservices. For example, the set of microservices may execute respective tasks and/or generate respective execution results. Additionally, or alternatively, the microservices application may generate an execution result based on the respective execution results of the set of microservices.

In this way, microservices platform 220 may receive information associated with an execution result, such that microservices platform 220 may perform an action based on the execution result, as described below.

As further shown in FIG. 4, process 400 may include performing an action based on the information associated with the execution result (block 490). For example, microservices platform 220 may perform an action based on the information associated with the execution result.

In some implementations, microservices platform 220 may perform an action that includes sending a notification. For example, microservices platform 220 may provide the notification to user device 210. In this case, user device 210 may provide the notification for display, via a user interface, to permit a user to identify the execution result.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for distributing data sets for reporting. In some implementations, one or more process blocks of FIG. 5 may be performed by microservices platform 220. In some implementations, one or more process blocks of FIG. 5 may be performed by another device or a group of devices separate from or including microservices platform 220, such as user device 210, data store 230, and/or external server 240.

As shown in FIG. 5, process 500 may include receiving a first set of data (block 510). For example, microservices platform 220 may receive a first set of data. In some implementations, the first set of data may correspond to the information associated with the event, as described above in connection with block 410.

In some implementations, microservices platform 220 may determine one or more actions to be performed on the first set of data based on the received first set of data. For example, microservices platform 220 may determine the one or more actions based on the set of data items as described above in connection with block 420.

As further shown in FIG. 5, process 500 may include transmitting the first set of data to a first data store for storage (block 520). For example, microservices platform 220 may transmit the first set of data to a first data store 230 for storage. In some implementations, the first data store may be of a first data format type. Additionally, or alternatively, the first data store may be a reporting database.

As further shown in FIG. 5, process 500 may include transmitting the first set of data to a node of a plurality of nodes that is configured to receive a second set of data from a second data store, perform an action on the first set of data and the second set of data to generate a third set of data, and transmit the third set of data to a third data store (block 530). For example, microservices platform 220 may transmit the first set of data to a node that may execute a microservice.

In some implementations, each node, of the plurality of nodes, is configured to receive a second set of data from a second data store 230. Additionally, or alternatively, the second data store 230 stores data that is of a second data format type that is different than a first data format type of the first data store 230. In some implementations, the second data store is a graph database.

In some implementations, the node may perform an action on the first set of data and the second set of data to generate a third set of data. Additionally, or alternatively, the node may transmit the third set of data to a third data store 230. Additionally, or alternatively, the third data store 230 may store data that is of a third data format type that is different than the first data format type and the second data format type. In some implementations, the third data store is a distributed database.

In some implementations, microservices platform 220 may determine the node to which to transmit the first set of data. Additionally, or alternatively, microservices platform 220 may determine the node to which to transmit the first set of data based on the first set of data. Additionally, or alternatively, microservices platform 220 may determine the node based on the action to be performed on the first set of data. In some implementations, microservices platform 220 may determine the node and/or nodes in a similar manner as described above in connection with FIG. 4.

In some implementations, microservices platform 220 may reformat the first set of data from the first data format type to the second data format type before transmission of the first set of data to the one of the plurality of nodes. For example, microservices platform 220 may perform similar operations as described above in connection with FIG. 4.

As further shown in FIG. 5, process 500 may include transmitting the third set of data from the third data store to the first data store for reporting (block 540). For example, microservices platform 220 may transmit the third set of data, from the third data store 230, to the first data store 230 for reporting.

In some implementations, microservices platform 220 may reformat the third set of data from the third data format type to the first data format type before transmission of the third set of data to the first data store.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations described herein provide a microservices platform that may receive information associated with an event that is to be processed by a set of microservices. Additionally, some implementations described herein permit the microservices platform to correlate a set of data items, that is associated with a same underlying event, and a unique identifier, and permit the microservices platform to store the set of data items in a set of data stores. In this way, the microservices platform may identify, using the unique identifier, that the set of data items is associated with a same underlying event, thereby maintaining accuracy of the microservices application.

Some implementations described herein permit the microservices platform to identify a set of tasks that is to be executed by the set of microservices. Additionally, some implementations described herein permit the microservices platform to determine a set of metrics associated with a set of computing resources that is executing the set of microservices (e.g., a processor utilization value, a memory utilization value, a network metric value, and/or the like). In this way, the microservices platform may distribute the tasks for execution based on respective metrics of the computing resources.

Thereby, some implementations described herein permit the microservices platform to load balance and/or efficiently distribute tasks for execution. In this way, some implementations described herein efficiently utilize processor and/or memory resources of computing resources, increase throughput, increase bandwidth, reduce latency, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more devices to:
receive a first set of data;
transmit the first set of data to a first data store for storage,
the first data store being of a first data format type;
determine, after transmitting the first set of data to the first data store, a set of tasks to be executed by a set of microservices;

determine a set of metrics associated with the set of microservices;

identify, based on the set of metrics, at least one of a throughput value satisfying a throughput value threshold or a processor utilization value satisfying a processor utilization value threshold;

select a node, of a plurality of nodes, associated with at least one of the throughput value satisfying the throughput value threshold or the processor utilization value satisfying the processor utilization value threshold;

transmit, based on selecting the node, the first set of data to the node to permit a microservice, of the set of microservices, to execute a task, of the set of tasks, each node, of the plurality of nodes, being configured to receive a second set of data from a second data store, the second data store being of a second data format type that is different than the first data format type, the node to execute the microservice on the first set of data and the second set of data to generate a third set of data, the node to transmit the third set of data to a third data store, and the third data store being of a third data format type that is different than the first data format type and the second data format type; and transmit the third set of data from the third data store to the first data store for reporting.

2. The system of claim 1, where the one or more devices are further to:

determine one or more actions to be performed on the first set of data based on receiving the first set of data; and perform the one or more actions.

3. The system of claim 1, where the first data store comprises a reporting database.

4. The system of claim 1, where the one or more devices are further to:

correlate the first set of data and a unique identifier; and where the one or more devices, when transmitting the first set of data to the first data store, are to:

transmit the first set of data to the first data store based on correlating the first set of data and the unique identifier.

5. The system of claim 1, where the one or more devices are further to:

determine the node to which to transmit the first set of data based on the first set of data; and where the one or more devices, when transmitting the first set of data to the node, are to:

transmit the first set of data to the node based on determining the node based on the first set of data.

6. The system of claim 1, where the one or more devices are further to:

determine the node to which to transmit the first set of data based on an action to be performed on the first set of data; and where the one or more devices, when transmitting the first set of data to the node, are to:

transmit the first set of data to the node based on determining the node based on action to be performed on the first set of data.

7. The system of claim 1, where the second data store comprises a graph database.

8. The system of claim 1, where the third data store comprises a distributed database or a linear database.

9. The system of claim 1, where the one or more devices are to:

reformat the first set of data from the first data format type to the second data format type before transmission of the first set of data to the node.

10. The system of claim 1, where the one or more devices are to:

reformat the third set of data from the third data format type to the first data format type before transmission of the third set of data to the first data store.

11. A method, comprising:

receiving, by a device, a first set of data;

transmitting, by the device, the first set of data to a first data store for storage, the first data store being of a first data format type;

determining, by the device after transmitting the first set of data to the first data store, a set of tasks to be executed by a set of microservices;

determining, by the device, a set of metrics associated with the set of microservices;

identifying, by the device and based on the set of metrics, at least one of a throughput value satisfying a throughput value threshold or a processor utilization value satisfying a processor utilization value threshold;

selecting, by the device, a node, of a plurality of nodes, associated with at least one of the throughput value satisfying the throughput value threshold or the processor utilization value satisfying the processor utilization value threshold;

transmitting, by the device and based on selecting the node, the first set of data to the node to permit a microservice, of the set of microservices, to execute a task, of the set of tasks, each node, of the plurality of nodes, being configured to receive a second set of data from a second data store, the second data store being of a second data format type that is different than the first data format type, the node to execute the microservice on the first set of data and the second set of data to generate a third set of data, the node to transmit the third set of data to a third data store, and the third data store being of a third data format type that is different than the first data format type and the second data format type; and transmitting, by the device, the third set of data from the third data store to the first data store for reporting.

12. The method of claim 11, further comprising:

determining one or more actions to be performed on the first set of data based on receiving the first set of data; and performing the one or more actions.

13. The method of claim 11, where the first data store comprises a reporting database.

14. The method of claim 11, further comprising:

determining the node to which to transmit the first set of data based on the first set of data; and where transmitting the first set of data to the node comprises:

transmitting the first set of data to the node based on determining the node to which to transmit the first set of data.

15. The method of claim 11, further comprising:

determining the node to which to transmit the first set of data based on an action to be performed on the first set of data; and where transmitting the first set of data to the node comprises:
transmitting the first set of data to the node based on determining the node.

16. The method of claim 11, further comprising:
reformatting the first set of data from the first data format type to the second data format type before transmission of the first set of data to the one of the plurality of nodes.

17. A non-transitory computer-readable medium storing instructions, the instructions comprising:
one or more instructions that, when executed by one or more processors of a device, cause the one or more processors to:
receive a first set of data;
transmit the first set of data to a first data store for storage,
the first data store being of a first data format type;
determine, after transmitting the first set of data to the first data store, a set of tasks to be executed by a set of microservices;
determine a set of metrics associated with the set of microservices;
identify, based on the set of metrics, at least one of a throughput value satisfying a throughput value threshold or a processor utilization value satisfying a processor utilization value threshold;
select a node, of a plurality of nodes, associated with at least one of the throughput value satisfying the throughput value threshold or the processor utilization value satisfying the processor utilization value threshold;
transmit, based on selecting the node, the first set of data to the node to permit a microservice, of the set of microservices, to execute a task, of the set of tasks,
each node, of the plurality of nodes, being configured to receive a second set of data from a second data store,
the second data store being of a second data format type that is different than the first data format type,
the node to execute the microservice on the first set of data and the second set of data to generate a third set of data,
the node to transmit the third set of data to a third data store, and
the third data store being of a third data format type that is different than the first data format type and the second data format type; and
transmit the third set of data from the third data store to the first data store for reporting.

18. The non-transitory computer-readable medium of claim 17, where the one or more instructions, when executed by the one or more processors, further cause the one or more processors to:
determine one or more actions to be performed on the first set of data based on receiving the first set of data; and
perform the one or more actions.

19. The non-transitory computer-readable medium of claim 17, where the second data store comprises a graph database.

20. The non-transitory computer-readable medium of claim 17, where the third data store comprises a distributed database.

* * * * *